United States Patent [19]

Arman

[11] 3,919,735

[45] Nov. 18, 1975

[54] MEANS FOR ENGAGEMENT BETWEEN THE ENDS

[76] Inventor: Dario Arman, Via Venaria, 13/15, 10040 Druento (Turino), Italy

[22] Filed: July 8, 1974

[21] Appl. No.: 486,687

[30] Foreign Application Priority Data

July 20, 1973 Italy.................................. 69176/73

[52] U.S. Cl. ............................................ 15/250.32
[51] Int. Cl.² ........................................... B60S 1/40
[58] Field of Search ....... 15/250.32, 250.31, 250.34, 15/250.35, 250.42, 250.36

[56] References Cited
FOREIGN PATENTS OR APPLICATIONS

| | | | |
|---|---|---|---|
| 1,930,156 | 12/1970 | Germany.......................... | 15/250.32 |
| 1,414,690 | 9/1965 | France............................. | 15/250.32 |
| 1,232,157 | 5/1971 | United Kingdom................ | 15/250.32 |

*Primary Examiner*—Peter Feldman
*Attorney, Agent, or Firm*—Burgess, Ryan and Wayne

[57] ABSTRACT

A coupling for pivotally releasably interconnecting a windshield wiper blade with an oscillating arm having a U-shaped end, includes a U-shaped resilient member having a base pivotally connected to the back mounting of the windshield wiper blade. A back portion of the coupling member extends from the base thereof, and a front portion is connected to the end of the back portion away from the base portion. A projection on the outer side of the back portion engages an aperture in the end of the U-shaped oscillating arm, with the front portion of the coupling member resiliently engaging the inside of the oscillating arm. The coupling member is provided with side ribs engaging the sides of the oscillating arm, and a spherical projection on the outside of its front portion.

3 Claims, 7 Drawing Figures

U.S. Patent  Nov. 18, 1975  3,919,735
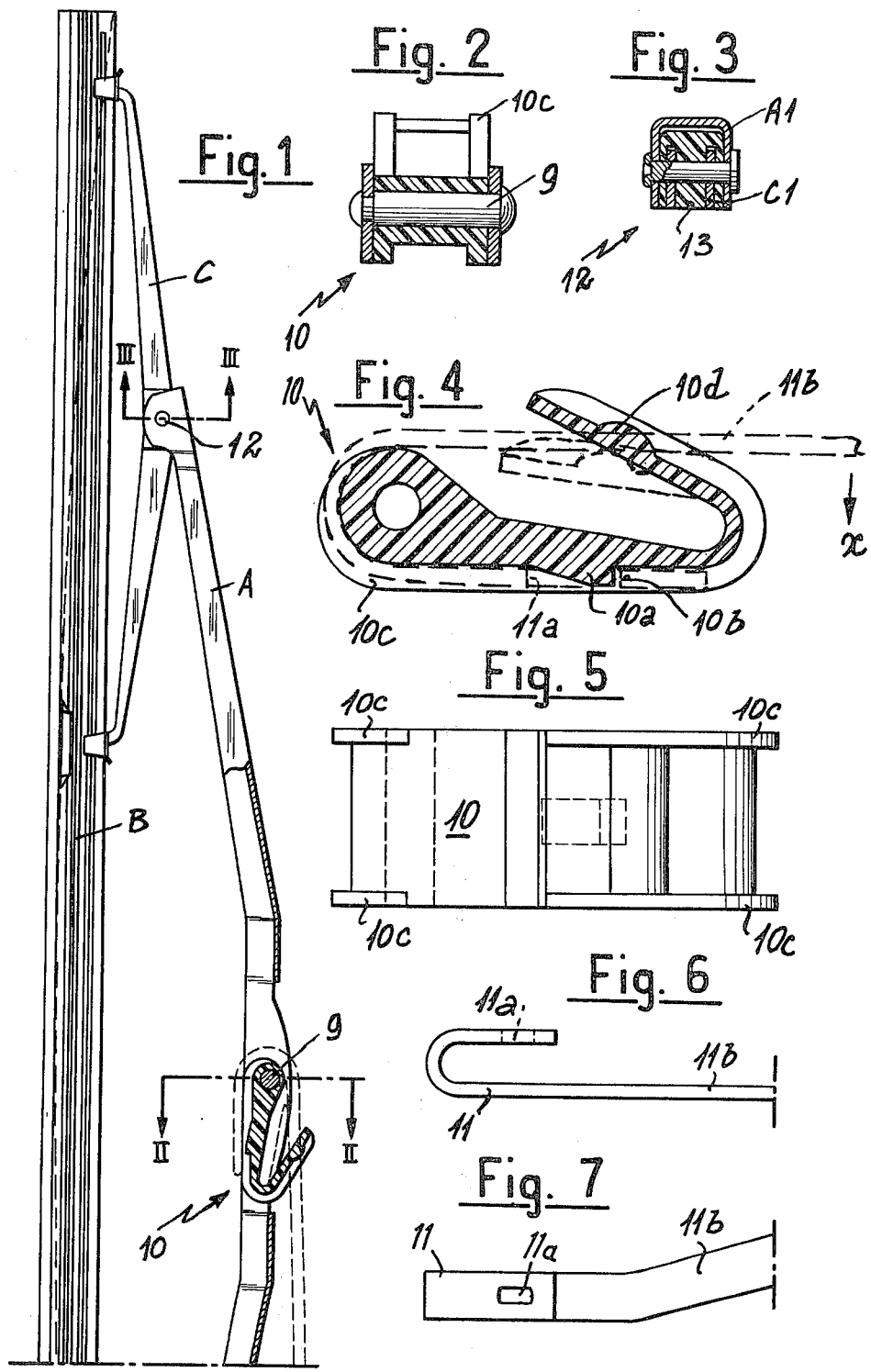

MEANS FOR ENGAGEMENT BETWEEN THE ENDS

The present invention relates to an improvement to the means for the engagement, by a releasable junction, between the ends of the oscillating arms and the back reinforcement of the windshield wiper blades of motor vehicles.

As is known, some oscillating arms, particularly in the windshield wiper installations on heavy motor vehicles, terminate with a hook-shapped free end. Instead of the known tongue type connection, used for wiper blades provided with a tile-shaped member, having a pressure spring and a seat to engage a retaining tooth carried by the flat end of the arm, the back reinforcement of the wiper blade must be provided with a member suitable to co-operate with the hook-shaped end of the oscillating arm. The major undesirable feature of this kind of connection between the arm end and the back member pivoted onto the central rod of the wiper blade resides in the impossibility of the spontaneous release of the connected parts, together with the easy separation and assembling of these parts by simple and normal operation without any need of implements or tools.

According to the said improvement and the above mentioned requirements, the subject matter of present invention broadly comprises a connection member pivoted onto the wiper blade back, intended to co-operate with the hook-shaped end of the corresponding oscillatable arm, characterized in that said member also has a substantially hook-shaped outline and is made of any suitable material that is moderately and resiliently deformable. The connection member is accommodated within the space of the arm terminal hook in a position longitudinally opposed with respect to the same.

Another feature of the connection member in accordance with this invention resides in a retaining tooth which, when the connection member is being coupled to the arm terminal hook, springs back in a hollow seat formed in the end of the arm terminal hook, providing a coupling between the member pivoted onto the wiper blade and the arm terminal hook, which may be released only by the resilient deformation of the first.

A further feature of the coupling according to the said improvement resides in that said member, pivoted onto the back bridge of the wiper blade, is provided with longitudinal ribs or edges provided in parallel along its sides and intended to restrain, in the widthwise direction, the hooked end of the oscillable arm in order to prevent any relative transverse movement between the pivoted member and the arm end.

The features of the improvement will become more apparent from the following specification which refers to the drawings utilized for illustrative purposes only and wherein:

FIG. 1 is a partial view of a wiper blade provided with the hooked member pivoted onto the central rod of the wiper blade;

FIG. 2 is a cross section view along line II—II of FIG. 1;

FIG. 3 is a further cross section view of the articulate connection between the central rod of the back support and the secondary rod or bridge, along line III—III of same FIG. 1;

FIG. 4 is a detailed longitudinal section along a vertical plane of the hook-shaped member, in a greater scale;

FIG. 5 is a top plan view of the same member of FIG. 4;

FIGS. 6 and 7 are respectively a side and a plan view of the hook-shaped end of the oscillable arm and co-operating with the hook-shaped member.

As represented in the drawings, in a median position relatively to the central rod A of the back bridge carrying the wiper element B, there is articulated the hook-shaped member 10 by means of a pivot 9 retained on the sides of rod A which, in the represented case, has a tile-shaped cross section, with an open bottom in correspondence with member 10 made of a suitable molded plastic material.

As represented on FIGS. 4 and 5, a member 10 has a substantially hook-shaped outline and is provided with the back tooth 10a which presents one edge 10b at a right angle to the back surface of the hook and the opposite edge chamfered in a slanting plane; said hook 10 being further provided with side ribs 10c which are parallel and symmetrical and which have such a height and a width as to contain the thickness and the width of the hook-shaped end 11 of the oscillatable arm, represented with dotted lines on FIG. 4.

End 11 of the oscillatable arm is bent as a hook, preferably laterally slanted as seen in FIGS. 6 and 7, is provided with an aperture 11a which accommodates and contains tooth 10a of hook 10 when the latter is forced within the U-shaped space of the hook. By elastic deformation, it slidingly enters said cavity, facilitated by the spherical projection 10d which together with the hook end comes in contact with and reacts against the plane surface of arm 11b.

As represented on FIG. 4, the connection between the hook-shaped end 11 and hook 10 is effected by opposing longitudinally the bent parts and, when the tooth 10a snaps in the cavity of aperture 11a, the elasticity of the compressed hook 10 generates by its elastic reaction a pressure which prevents the spontaneous or casual release of the parts.

To remove the wiper blade from the arm, it is sufficient to lift the arm and move the wiper blade away from the windscreen and then depress the hook 10 in the direction indicated by arrow x on FIG. 4 or by maneuvering the arm 11b and holding the wiper blade to stand still or vice versa. By doing so, the tooth 10a comes out from aperture 11a and therefore the wiper blade separates from end 11 of arm 11b.

The width of the hook-shaped end 11 of the arm is such as to be perfectly contained between the side ribs 10c of hook 10; this arrangement assures the coupling in the transverse directions between the arm end and the wiper blade further prevents any relative movement between the two members and, even if it would occur, it would generate no noise, in that the hook 10 is made of molded plastic.

In order to avoid any noise and to maintain the perfect efficiency of the articulations between the elements forming the back bridge of the wiper blades provided with the hook-shaped member 10, the articulations between end $A_1$ of the central rod A and the back $C_1$ of the secondary rods C, are equipped with bearings 13 molded of suitable plastic as seen in FIG. 3.

From the foregoing, the advantages deriving from the improvement according to the invention, provide a reliable engagement between the oscillating arm and the wiper blade which is easily releasable, devoid of noise, and not subject to oxidation.

I claim:

1. In a releasable articulated coupling for interconnecting a windshield wiper blade to an oscillating arm of a motor vehicle, wherein the windshield wiper blade has a back mounting including a pair of parallel spaced apart back mounting members and the oscillating arm has a U-shaped end with a recess in its free end, and a coupling member is provided interconnecting the blade and the oscillating arm; the improvement wherein said coupling member comprises a resilient molded plastic hook-shaped member having a base pivotally mounted between said back mounting members, a back portion extending from said base, a front portion extending from the end of said back portion away from said base, a projection on the side of said back portion away from said front portion, and parallel side ribs forming a channel around said coupling member for receiving said U-shaped end of said arm, whereby said oscillating arm may be snapped onto said coupling member with the U-shaped end thereof extending over the base of said member and the projection of said member engaging said recess in said oscillating arm.

2. The articulated coupling of claim 1, wherein said projection has a bevelled side toward said base and the side of said projection away from said base extends at right angles to said back portion.

3. The articulated coupling of claim 2 further comprising a spherical projection on said front portion of said member on the side thereof away from said back portion, whereby said spherical projection engages the inner surface of the U-shaped end of said oscillating arm.

* * * * *